Aug. 9, 1938.  O. WITTEL  2,126,300
COLLAPSIBLE CAMERA
Filed Oct. 22, 1937
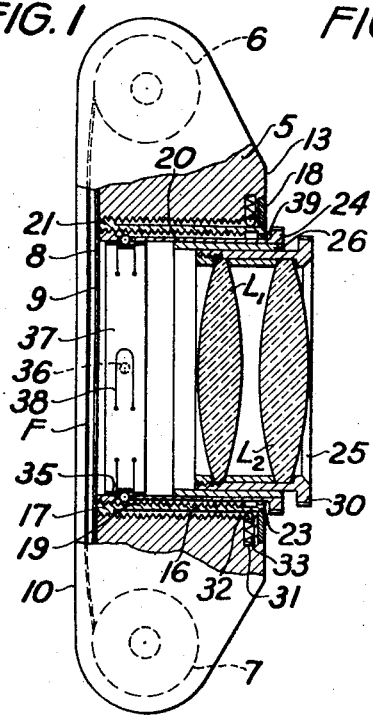
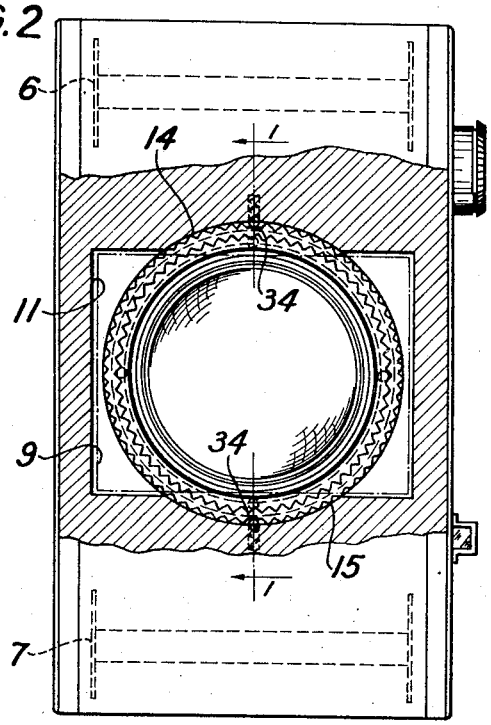
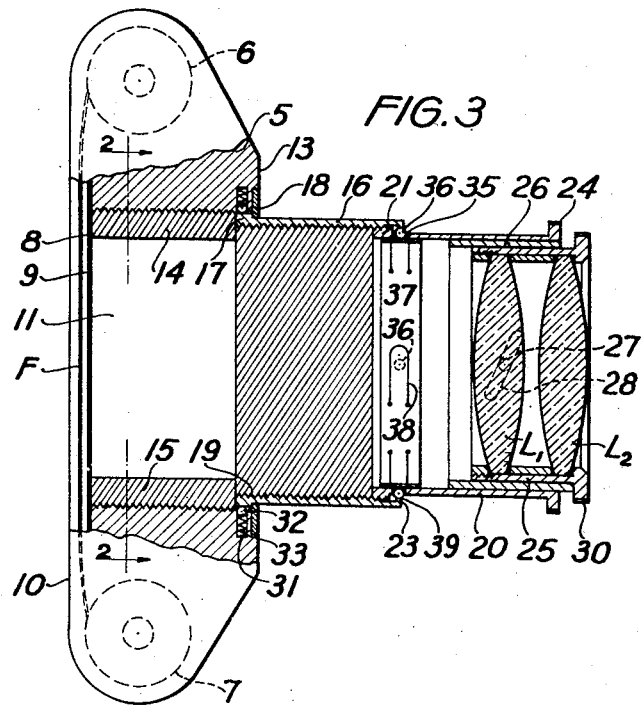
Otto Wittel
INVENTOR
BY
ATTORNEYS Patented Aug. 9, 1938

2,126,300

UNITED STATES PATENT OFFICE 2,126,300

COLLAPSIBLE CAMERA

Otto Wittel, Rochester, N. Y., assignor to Eastman Kodak Company, Rochester, N. Y., a corporation of New Jersey Application October 22, 1937, Serial No. 170,367

8 Claims. (Cl. 95—45)

The present invention relates to photography, and particularly to a collapsible camera wherein the customary bellows is supplemented by a plurality of tubular sections in telescopic relation which carry the lens mount and can be extended from or retracted into the camera body through a partial rotation of the parts.

One object of the present invention is the provision of a camera wherein the lens mount is carried by a plurality of tubular sections arranged in telescopic threaded engagement whereby the lens can be extended from or retracted into the camera body by a partial rotation of the telescopic parts relative one to the other. Another object is the provision of a camera of the type described wherein the telescoping sections are so arranged that the screw threaded engagement is not exposed at any time thereby giving a smooth finished appearance when in the extended position, and also protecting the threads from dirt and damage. Still another object is the provision of spring pressed locating means between the relatively movable telescoping sections by means of which said sections are located in their proper extended positions when rotated in the proper direction. And yet another object is the provision of a camera of the type described which is so arranged that when in a collapsed position the lens mount and the telescoping tubular sections supporting the same will be substantially contained within the camera body. A further object is the provision of a camera of the type described wherein the telescoping sections are arranged so that they can be assembled easily, but cannot be disassembled accidentally. And yet a further object is the provision of an arrangement of the type described wherein the parts are moved to and from their collapsed and extended positions through relative rotation only of the parts. And another object is the provision of an arrangement of the type described wherein the lens mount is independently adjustable relative to one of the telescoping sections for focusing purposes.

Briefly, my invention comprises a relatively narrow camera body having a threaded recess extending substantially therethrough. In threaded engagement with the recess in the camera body is an internally threaded tubular member which has an outwardly extending threaded radial flange on its rear end, said flange being in threaded engagement with the recess whereby the tubular member, which is of a length equal to that of the recess, can be retracted into or extended from said recess through a rotation thereof. A sleeve having an outwardly extending radial flange on its rear end is in threaded engagement with the tubular member and can be retracted thereinto upon rotation of said sleeve. Means are provided on the front end of the camera and on the front end of the tubular member for limiting the outward movement of the parts relative one to another. Means is also provided between the camera and the tubular member, as well as between the tubular member and the sleeve, for locating the same in their proper extended positions. A lens mount is telescopically arranged within the sleeve and connected thereto so that a longitudinal focusing adjustment of the lens can be effected by a rotation of the same.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which, Fig. 1 is a side view of a camera, taken substantially on line 1—1 of Fig. 2, showing the preferred embodiment of the collapsible lens supporting structure in its collapsed position, Fig. 2 is a rear view of the camera, taken substantially on line 2—2 of Fig. 3, showing the threaded engagement of the telescoping sections in relation to the exposure aperture of the camera, and Fig. 3 is a view similar to Fig. 1, but showing the telescoping parts moved to their extended picture-taking positions.

Like reference characters refer to corresponding parts throughout the drawing.

Referring now to the drawing, the camera body 5, although it can be made of any suitable material, is preferably formed from a relatively narrow block of metal and is preferably rectangular in shape. At either end of the camera body spool chambers, not shown, are provided in which the film spools 6 and 7 are rotatably mounted so that the film strip F can be moved past the exposure plate 8, having a rectangular exposure aperture 9 therein, in the focal plane of the camera by any suitable film advancing means, not shown. The rear wall 10 of the camera can be hinged to the front part of the camera body 5 or can be removably attached thereto in any other well known manner in order that access to the spool chamber can be had for loading and unloading the camera.

The camera body is provided with a recess 11 extending from the exposure plate 8 through the front wall 13 of the camera body, said recess being substantially rectangular in shape, see Fig. 2, and of exactly the same dimensions or of a slightly greater dimension than the exposure aperture 9 in the exposure plate 8. The top and bottom of the recess 11 are milled out and threaded to form arcuate threaded portions 14 and 15 which are portions of a given circle. These arcuate threaded portions extend the full length of the recess 11 and provide for the threaded engagement between the tubular member 16 and the recess for the purpose hereinafter described. It will be readily understood looking at Fig. 2, that if the recess 11 was made entirely circular to conform to the size of the telescoping lens carrying sections, the image projected through said sections would be circular and the corners of the exposure aperture 9 would be cut off. Hence, the reason for forming the recess 11 as described will be understood to be for the purpose of allowing the image to cover the entire exposure aperture 9, and at the same time provide for a threaded engagement between the recess 11 and the tubular member 16 whereby the latter may be moved into and out of the camera body through a partial rotation thereof.

The tubular member 16 is finished on its exterior with the exception of a threaded radial flange 17 on its rear end which is in threaded engagement with the threaded arcuate portions 14 and 15 of the recess 11. The engaging threads on the flange 17 and on the arcuate portions 14 and 15 are made multiple and steep so that the tubular member 16, which is equal in length to the depth of the recess 11, can be moved between its full extended position, shown in Fig. 3, to its full collapsed position within the recess 11, see Fig. 1, by a partial rotation of the same. For eliminating the outward movement of the tubular member 16 relative to the camera body 5 an apertured stop plate 18 is fixed in a recess in the front wall of the camera, the aperture in said plate being of a size to permit the forward end of the tubular member to move therethrough, but being small enough to engage and prevent the radial flange 17 from passing therethrough. This stop plate 18 while serving to limit the outward movement of the tubular member to prevent accidental disengagement, also serves to shield the threaded engagement between the tubular member and the camera body from view as well as to protect the threads against dust and damage.

The tubular member 16 is internally threaded as shown at 19, and receives the sleeve 20 in threaded engagement. The periphery of the sleeve 20 is finished with the exception of a threaded radial flange 21 on the rear end thereof which is in threaded engagement with the internal threads 19 of the tubular ember 16. The threads 19 and those on the flange 21 of the sleeve 20 are also multiple and steep so that these two parts can be extended or collapsed relative to one another by a partial rotation of the sleeve 20. An inturned flange 23 on the forward end of the tubular member engages the finished periphery of the sleeve and provides a limiting stop for the flange 21 thereon to prevent accidental separation of the sleeve 20 from the tubular member 16. This inturned flange 23 on the forward end of the tubular member in addition to serving as a stop as above described, also serves to shield the threaded engagement between the tubular member and the sleeve from view as well as to protect the threads against dirt and damage.

A knurled flange 24 may be provided on the forward end of the sleeve 20 to give a hand grip by means of which the sleeve can be rotated relative to the tubular member for extending or collapsing the two parts.

A lens mount 25 including lenses L' and L' may be telescopically arranged in the forward end of the sleeve 20 in any suitable manner so as to be capable of axial movement relative thereto for focusing purposes. As one means of accomplishing this arrangement, I have shown a ring 26 fixed in the forward end of the sleeve 20 in any suitable manner to move therewith. In telescopic engagement with this sleeve is the lens mount 25, and to provide for the focusing adjustment of the mount relative to the sleeve a pin 27 extending radially from the mount engages a diagonal slot 28 in the periphery of the ring 26. It should be understood that the pin 27 is not long enough to extend through the sleeve 20, but its length is equal to or slightly less than the thickness of the ring 26. By gripping the knurled radial flange 30 on the forward end of the mount and rotating the same, the mount will be moved axially of the sleeve for focusing purposes.

For properly locating the tubular member 16 and the sleeve 20 in their extended picture-taking positions the following structure is provided. The camera body 5 adjacent the arcuate threaded portions 14 and 15 is provided with ball seats 31 in which balls 32 are held so that they can extend into the recess 11, but will not fall out of said seats. A spring 33 situated behind the ball normally tends to force said ball into the recess 11. The periphery of the radial flange 17 on the rear of the tubular member 16 is provided with two diametrically spaced notches 34, see Fig. 2, in which the balls 32 are adapted to snap when the tubular member is in its proper extended position relative to the camera body 5. When the tubular member 16 is moved to or from its proper position the balls 32 will ride in the screw threads, and although the entrance of the balls into the notches 34 will not give a positive positioning means it will provide a click which can be felt or heard indicating the proper position of the two. If the tubular member should be screwed out past the proper position, it will be positively stopped by the stop plate 18 on the front wall 13 of the camera.

Sleeve 20 is provided with four ball seats 35 just ahead of the flange 21 thereon in which balls 36 are seated to extend slightly beyond the periphery of the sleeve. These balls 36 are held in place by a spring ring 37 slipped into the sleeve 20, and the struck up portions 38 of the spring ring engage the balls 36 and normally force them into the ball seats 35. The inturned flange 23 of the tubular member 16 is provided with four notches 39 circumferentially spaced correspondingly to the balls 36 so that when the sleeve is extended to its proper position the balls 36 snap thereinto giving the same indication of proper location as described in connection with the spring pressed balls 32 in the camera body 5. If the sleeve should be extended beyond its proper position, the internal flange 23 of the tubular member 16 will engage the radial flange 21 on the sleeve and provide a positive stop, and when the sleeve is retracted into the tubular member the balls 36 will ride in the screw threads 19 of the tubular member.

To bring the lens carrying structure to its full extended position from the collapsed position shown in Fig. 1, the knurled flange 24 is gripped and the sleeve 20 is partially rotated in the proper direction, until the balls 36 therein snap into the notches 39 of the inturned flange 23 of the tubular member. Sufficient frictional engagement is set up by this ball and notch engagement so that a further rotation of the sleeve 20 will cause the tubular member 16 to be rotated relative to the camera body bringing it to its proper extended position. Depending upon the multiplicity and pitch of the threaded engagement between the parts, the complete extension of the tubular member and the sleeve can be effected by a half or any portion of rotation of the sleeve that may be desired. I have found it preferable to have the extension completed through a half revolution of the sleeve. Actually, due to the frictional engagement between the threaded parts the sleeve 20 will not be extended completely before the tubular member starts to rotate, but the two will rotate together until near the end of their travel where the sleeve will then proceed to assume its final position just ahead of the tubular member 16. After the tubular member and sleeve have been extended, the lens mount, which should work freely, is focused by rotating it relative to the sleeve. The structure is collapsed by an operation just the reverse to that for extending the parts, namely rotating the sleeve 20 in the proper direction by gripping flange 24 until the position shown in Fig. 1 is obtained.

From the above description it will be readily understood that the above-described structure provides a collapsible camera which is simple and rapid to operate, the parts being moved between their proper extended and collapsed positions by a simple twist of the wrist. The structure provides that the threaded engagement between the parts at all times will be covered so as to give a neat appearing structure, and at the same time be protected against the accumulation of dirt or otherwise becoming damaged. Movement of the several parts relative to one another is supervised at all times by threaded engagement, thus avoiding a combination of a sliding and threaded engagement which is more or less cumbersome and which entails frictional wear between the sliding parts.

Although I have shown and described one embodiment of my invention, I am fully aware that many modifications thereof are possible. My invention, therefore, is not to be restricted except in so far as is necessitated by the prior art and by the spirit of the appended claims.

Having thus described my invention, what I claim is new and desire to secure by Letters Patent of the United States is:

1. In a collapsible camera the combination of a narrow camera body having a threaded recess therein, an internally threaded tubular member, an outwardly extending threaded radial flange on the rear end of said tubular member in threaded engagement with said recess, whereby said tubular member is adapted to be moved into and out of said recess upon rotation, a sleeve, a radial threaded flange on said sleeve in threaded engagement with said tubular member to move into and out thereof upon rotation, means on the camera body for limiting the outward movement of the tubular member relative thereto, means on the tubular member for limiting the outward movement of the sleeve relative thereto, a lens mount telescopically arranged within the sleeve, and a focusing connection between the sleeve and the mount whereby an axial movement of the mount relative to the sleeve will be effected by rotation thereof.

2. In a collapsible camera the combination of a narrow camera body having a threaded recess therein, an internally threaded tubular member, an outwardly extending threaded radial flange on the rear end of said tubular member in threaded engagement with said recess, whereby said tubular member is adapted to be moved into and out of said recess upon rotation, a sleeve, a radial threaded flange on said sleeve in threaded engagement with said tubular member to move into and out thereof upon rotation, a stop member on the camera body extending radially into the recess therein for engaging said radial flange on the tubular member to limit the outward movement of the tubular member relative to the camera body, means on the tubular member for limiting the outward movement of the sleeve relative thereto, a lens mount telescopically arranged within the sleeve, and a focusing connection between the sleeve and the mount whereby an axial movement of the mount relative to the sleeve will be effected by rotation thereof.

3. In a collapsible camera the combination of a narrow camera body having a threaded recess therein, an internally threaded tubular member, an outwardly extending threaded radial flange on the rear end of said tubular member in threaded engagement with said recess, whereby said tubular member is adapted to be moved into and out of said recess upon rotation, a sleeve, a radial threaded flange on said sleeve in threaded engagement with said tubular member to move into and out thereof upon rotation, a stop member on the camera body extending radially into the recess therein for engaging said radial flange on the tubular member to limit the outward movement of the tubular member relative to the camera body, an inwardly extending radial flange on the forward end of the tubular member adapted to engage the outwardly extending radial flange on the sleeve and limit the outward movement of the sleeve relative to the tubular member, a lens mount telescopically arranged within the sleeve, and a focusing connection between the sleeve and the mount whereby an axial movement of the mount relative to the sleeve will be effected by rotation thereof.

4. In a collapsible camera the combination of a narrow camera body having a threaded recess therein, an internally threaded tubular member, an outwardly extending threaded radial flange on the rear end of said tubular member in threaded engagement with said recess, whereby said tubular member is adapted to be moved into and out of said recess upon rotation, cooperating means in the camera body and on the tubular member for locating the tubular member in proper extended position relative to the camera body, a sleeve, a radial threaded flange on said sleeve in threaded engagement with said tubular member to move into and out thereof upon rotation relative thereto, cooperating means between the sleeve and the tubular member for locating the sleeve in proper extended position relative to the tubular member, means on the camera body for limiting the outward movement of the tubular member relative thereto, means on the tubular member for limiting the outward movement of the sleeve relative thereto, a lens mount telescopically arranged within the sleeve, and a focusing connection between the sleeve and the mount whereby an axial movement of the mount relative to the sleeve will be effected by rotation thereof.

5. In a collapsible camera the combination of a narrow camera body having a threaded recess therein, an internally threaded tubular member, an outwardly extending threaded radial flange on the rear end of said tubular member in threaded engagement with said recess, whereby the tubular member is adapted to be moved into and out of said recess upon rotation, one or more spring pressed balls seated in one or more ball seats in the camera body and extending into the recess therein, said balls adapted to snap into notches formed in the radial flange on the tubular member to locate said tubular member in its proper extended position relative to the camera body, a sleeve, a radial threaded flange on said sleeve in threaded engagement with said tubular member to move into and out thereof upon rotation relative thereto, cooperating means between the sleeve and the tubular member for locating the sleeve in proper extended position relative to the tubular member, means on the camera body for limiting the outward movement of the tubular member relative thereto, means on the tubular member for limiting the outward movement of the sleeve relative thereto, a lens mount telescopically arranged within the sleeve, and a focusing connection between the sleeve and the mount whereby an axial movement of the mount relative to the sleeve will be effected by rotation thereof.

6. In a collapsible camera the combination of a narrow camera body having a threaded recess therein, an internally threaded tubular member, an outwardly extending threaded radial flange on the rear end of said tubular member in threaded engagement with said recess, whereby said tubular member is adapted to be moved into and out of said recess upon rotation, one or more spring pressed balls seated in one or more ball seats in the camera body and extending into the recess therein, said balls adapted to snap into notches formed in the radial flange on the tubular member to locate said tubular member in its proper extended position relative to the camera body, a sleeve, a radial threaded flange on said sleeve in threaded engagement with said tubular member to move into and out thereof upon rotation relative thereto, one or more balls positioned in ball seats spaced around the periphery of the sleeve, a spring ring in said sleeve normally forcing said balls beyond the periphery of the sleeve whereby they are adapted to engage notches in the tubular member to locate the sleeve in proper extended position relative to the tubular member, means on the camera body for limiting the outward movement of the tubular member relative thereto, means on the tubular member for limiting the outward movement of the sleeve relative thereto, a lens mount telescopically arranged within the sleeve, and a focusing connection between the sleeve and the mount whereby an axial movement of the mount relative to the sleeve will be effected by rotation thereof.

7. In a collapsible camera the combination of a narrow camera body having a threaded recess therein, an internally threaded tubular member, an outwardly extending threaded radial flange on the rear end of said tubular member in threaded engagement with said recess, whereby said tubular member is adapted to move into and out of said recess upon rotation, one or more spring pressed balls seated in one or more ball seats in the camera body and extending into the recess therein, said balls adapted to snap into notches formed in the radial flange on the tubular member to locate said tubular member in its proper extended position relative to the camera body, a sleeve, a radial threaded flange on said sleeve in threaded engagement with said tubular member to move into and out thereof upon rotation relative thereto, one or more balls positioned in ball seats placed around the periphery of the sleeve, a spring ring in said sleeve normally forcing said balls beyond the periphery of the sleeve whereby they are adapted to engage notches in the tubular member to locate the sleeve in proper extended position relative to the tubular member, a stop member on the camera body extending radially into the recess therein for engaging said radial flange on the tubular member to limit the outward movement of the tubular member relative to the camera body, an inwardly extending radial flange on the forward end of the tubular member adapted to engage the outwardly extending radial flange on the sleeve and limit the outward movement of the sleeve relative to the tubular member, a lens mount telescopically arranged within the sleeve, and a focusing connection between the sleeve and th mount whereby an axial movement of the mount relative to the sleeve will be effected by rotation thereof.

8. In a collapsible camera the combination of a narrow camera body having spaced interior walls, an internally threaded recess formed in two of the spaced interior walls and extending partially therethrough, an internally threaded tubular member, a threaded outwardly extending radial flange on the rear end of said tubular member in threaded engagement with the threaded recesses in the camera body for moving said tubular member into and out of said recesses, a stop member on the camera body extending radially into said recesses therein to engage the flange on the tubular member to prevent removal thereof from the recesses, a sleeve, a threaded radial flange on the rear end of the sleeve in threaded engagement with the internal threads of said tubular member, means for limiting the relative longitudinal movement between the sleeve and the tubular member, and a lens mount telescopically arranged within said tubular member for focusing purposes.

OTTO WITTEL.